Patented Nov. 8, 1949

2,487,668

UNITED STATES PATENT OFFICE 2,487,668

SEPARATION OF PENICILLINS

Richard Pasternack, Islip, N. Y., and Peter P. Regna, West New York, N. J., assignors to Chas. Pfizer & Co., Inc., Brooklyn, N. Y., a corporation of New Jersey No Drawing. Application October 17, 1945, Serial No. 622,944

5 Claims. (Cl. 260—302)

This invention relates to the separation of different forms of penicillin, and especially to the separation of penicillin G from accompanying therapeutically similar compounds such as penicillin F and various mold pigments with which it is usually associated, and its object is to provide a novel and improved process for this purpose.

Various other objects and advantages will be apparent as the nature of the invention is more fully disclosed.

The therapeutic penicillin now generally available is a mixture containing various proportions of more than one variety of penicillin (see for example "Penicillin" by W. H. Schmidt et al., J. Bacteriology 49: 411–12, April 1945; or the section on "Other Penicillins," etc., by Van Winkle & Herwick, p. 107 J. Am. Pharm. Assoc., Scientific edition, April 1945). It also contains colored materials which are metabolic products of the generating mold. As is evident from the references cited, the different penicillins differ in their effectiveness against specific microorganisms. For example, against *B. subtilis* the potency of penicillin F having the formula

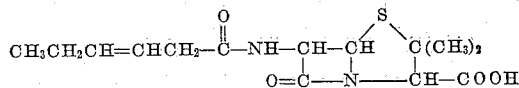

is about 1117 u./mg. while against *S. aureus* it is 1667 u./mg. Penicillin G having the formula

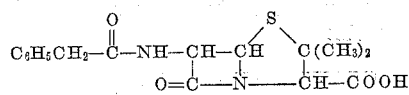

on the other hand, has a potency of 1667 u./mg. against *B. subtilis* and against *S. aureus*. The ratio of the activity of a given penicillin against *B. subtilis* to that against *S. aureus* is a convenient, if not very accurate, indicator of the porportion of the active constituents in a mixture of penicillins; for pure penicillin F the ratio is about 0.7, while for penicillin G it is approximately 1.

Separation of the various penicillins obviously is desirable so that each constituent may be used at its fullest efficiency. A further advantage is that purification is greatly facilitated thereby. However, separation has been a most perplexing problem, not only because the different penicillins have very similar solubilities, but also because they appear to exert both a solubilizing and an adsorbent effect upon each other.

It is known to adsorb penicillin and the accompanying mold pigments from the crude fermentation solution upon carbon, to elute from the carbon with an organic solvent, to acidify the resulting solution and then extract with dilute sodium bicarbonate solution, thus obtaining a mixture of the sodium salts which is of substantially higher purity and concentration than the fermentation solution. Repetitions and/or variations of this process and such expedients as making the final extraction with a suspension of calcium carbonate or hydroxide may be so devised as to achieve a further degree of purification, but such a process does not separate the constituents.

We have now found that a substantial degree of separation of the constituents may be obtained by treating the crude penicillin mixture in mildly acid aqueous solution with a suitable beryllium compound. The preferable pH value of the solution during treatment lies in the range 4.5 to 5.7 and especially favorable results are usually obtained at a pH very close to 5.5, but the degree of acidity is not critical. Suitable beryllium compounds are for example, the acetate, bromide, carbonate, chloride, fluoride, hydroxide, oxalate, sulfate, etc. Upon treatment with such a beryllium compound a voluminous precipitate forms at once. It consists primarily of the beryllium salts of penicillin F and its more closely related homologues and associated substances such as mold pigments, leaving most of the beryllium salt of penicillin G in solution. Apparently a minor proportion of the beryllium salt of penicillin G is adsorbed upon the precipitate; at any rate the separation is not quantitative, but no potency is lost and by filtering out the precipitate an aqueous solution of beryllium salt of penicillin G nearly free from beryllium salt of penicillin F is obtained. This solution is acidified to pH 2, and the penicillin G extracted with isopropyl acetate, from which it is reextracted with aqueous sodium bicarbonate. Upon freeze-drying the aqueous solution and suspending the dried product in acetone, crystallization of penicillin G in a very pure condition takes place immediately. This occurs even when the dried product is of rather low purity—for example 60%.

It could not be expected that the beryllium salts of the penicillins would be stable, since a large number of metallic cations inactivate penicillin. On the other hand, the previously known stable metallic salts of penicillin are watersoluble. A useful property of the beryllium salts of penicillin in general, is that they are soluble in organic solvents such as dioxan, acetone, pyridin, chloroform, etc., which also dissolve free acid penicillins, but not their previously known metallic salts. It is further worth noting, that although the pure beryllium salt of penicillin G is not highly soluble in water, in a crude solution containing mold pigments the same compound becomes substantially more soluble and in the process which we have devised is easily separated from the relatively insoluble beryllium salts of penicillin F and the other compounds which come out of solution with it. When this precipitate after acidification is dissolved in an organic solvent, a partial separation of its constituents may be obtained by treating the solution with aqueous extractants of progressively increasing pH. Apparently the penicillins present differ in their activity as acids, and a pH above 7.8 is required to fix the weakest acid of the group. The final separation of these penicillins is accomplished chromatographically.

*Example 1.*—140 cc. of an aqueous solution of crude penicillin containing 4.2 million units and extracted from a broth made by the submerged fermentation process using a selected strain of *P. notatum* was treated with an aqueous solution containing 0.7 g. beryllium chloride adjusted to a pH 5.5. The voluminous precipitate which formed at once was filtered and washed with ice water. The filtrate containing the beryllium salt of penicillin G was acidified and the penicillin extracted with isopropylacetate, then reextracted from the organic solvent with dilute sodium bicarbonate solution to pH 7.3. The precipitate was suspended in water, acidified, extracted into isopropyl acetate, and reextracted with aqueous sodium bicarbonate to pH 7.7. The sodium salts from the filtrate and precipitate were then freeze-dried.

Results

|  | Million units |
|---|---|
| Original penicillin solution | 4.20 |
| Beryllium filtrate in isopropyl acetate | 2.38 |
| Beryllium precipitate in isopropyl acetate | 1.93 |

Potencies of dried materials

|  | Filtrate (Penicillin G) | Precipitate (Penicillin F) | Plant control (Original solution freeze-dried) |
|---|---|---|---|
| $[\alpha]_D^{24°}$ degrees | 100 | 77 | 84 |
| Bioassay (Turbidimetric) U./mg. | 870 | 976 | 803 |
| Ratio *B. subtilis*/*S. aureus* | 0.92 | 0.72 | 0.79 |

*Example 2.*—100 cc. of a solution of sodium penicillin similar to that used in Example 1 was treated with 3 grams of finely powdered beryllium sulfate and adjusted to pH 5.5 while stirring rapidly. The bulky precipitate was filtered and washed with ice water.

The beryllium precipitate was decomposed with dilute acid, extracted into isopropyl acetate and reextracted with dilute sodium bicarbonate to pH 7.8, separated and further extracted to pH 8.8. The filtrate was acidified, extracted into isopropyl acetate and reextracted with sodium bicarbonate to pH 7.1.

Instead of isopropyl acetate, ether may be used to extract the free acid penicillins. For reextraction of penicillin from the orgnic solvent, it is sometimes advantageous to use an aqueous solution of phosphate buffer at pH 8.5.

Results

|  | Million units |
|---|---|
| Original penicillin solution | 3.30 |
| Beryllium filtrate in isopropyl acetate | 2.40 |
| Beryllium precipitate in isopropyl acetate | 1.08 |

(a) $NaHCO_3$ extracted to pH 7.8=890,000 units.
(b) NaOH extracted to pH 8.8=175,500 units.

Potencies of dried materials

|  | Filtrate (penicillin G) | Precipitate (to pH 7.8) (Penicillin F) | Precipitate (to pH 8.8) (low ratio penicillin) | Control |
|---|---|---|---|---|
| $[\alpha]_D^{24°}$ degrees | +160 | +142 | +100 | +130 |
| Bioassay U/mg. | 900 | 875 | 210 | 920 |
| Ratio *B. subtilis*/*S. aureus* | 0.98 | 0.72 | 0.47 | 0.82 |

The penicillin having a ratio *B. subtilis*/*S. aureus*=0.50 appears to have properties somewhat different from those of the known penicillins. It was isolated in crystalline form by extracting from acidified aqueous solution into isopropyl acetate and chromatographing on a Florisil column. The column was developed with wet isopropyl acetate until the dark colored pigments were removed. After extruding the column and eluting sections of the Florisil with 70% acetone, the new penicillin was found low in the column and beneath a light yellow band. After filtering off the Florisil, the acetone eluate was evaporated under diminished pressure at room temperature and the aqueous residue was freeze-dried. The resulting yellow powder was dissolved in the minimum amount of moist ethyl acetate and allowed to crystallize. Its physical and chemical properties are measurably different from the known penicillins, and, in addition, the crystalline material has a *B. subtilis*: *S. aureus* ratio of about 0.50.

Typical tests of its activity against *B. subtilis* and *S. aureus* respectively are shown in the following table:

| *B. subtilis* | *S. aureus* | *B. subtilis* / *S. aureus* |
|---|---|---|
| 880 | 1,740 | .50 |
| 940 | 1,770 | .53 |
| 920 | 1,850 | .49 |
| 880 | 1,820 | .48 |
|  | 1,780 |  |

The invention claimed is:

1. A process for separating pencillin G from a mixture of penicillin G and penicillin F which comprises adding a water-soluble ionizable beryllium compound to an aqueous solution containing a mixture of pencillin F and penicillin G at a pH of 4.5 to 5.7, removing the water-insoluble precipitate of the beryllium salt of penicillin F and acidifying the beryllium salt of penicillin G in the residual aqueous solution, extracting with an organic solvent the free penicillin formed thereby, then re-extracting said penicillin with an aqueous solution of sodium bicarbonate.

2. Claim 1 wherein the pH of the aqueous solution is 5.5.

3. Claim 1 wherein the water-soluble ionizable beryllium compound is beryllium chloride.

4. Claim 1 wherein the water-soluble beryllium compound is beryllium sulfate.

5. As a new product, the beryllium salt of penicillin F.

RICHARD PASTERNACK.
PETER P. REGNA.

REFERENCES CITED

The following references are of record in the file of this patent:

Lancet II, pages 177–189, Aug. 16, 1941.
British Journal of Experimental Pathology, vol. 23, June 1942, pages 103–123.